Jan. 15, 1963 H. D. NACHBAR ETAL 3,073,961
SHIPPING CONTAINER FOR RADIOACTIVE MATERIAL
Filed June 8, 1960 3 Sheets-Sheet 1

INVENTORS
HENRY D. NACHBAR
BILLY B. BIGGS
PAUL J. TARIELLO
KURT O. GEORGE

Jan. 15, 1963 H. D. NACHBAR ETAL 3,073,961
SHIPPING CONTAINER FOR RADIOACTIVE MATERIAL
Filed June 8, 1960 3 Sheets-Sheet 2
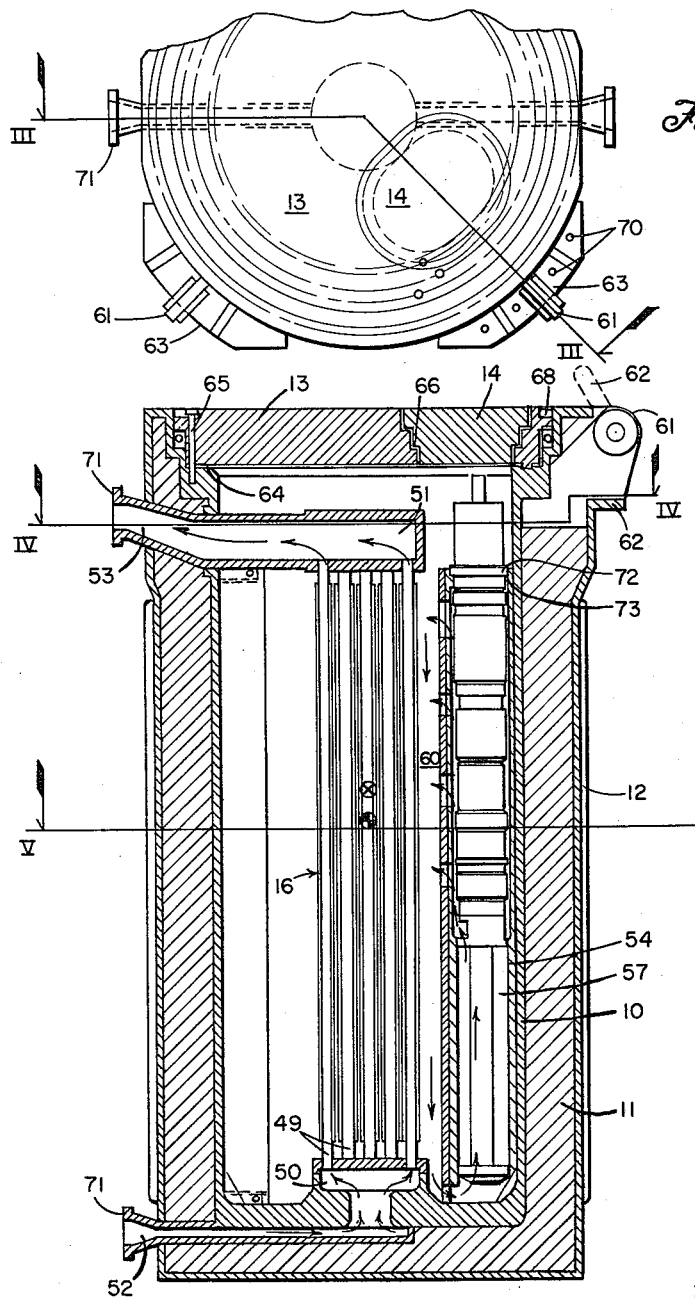
INVENTORS
HENRY D. NACHBAR
BILLY B. BIGGS
PAUL J. TARIELLO
KURT O. GEORGE
BY Jan. 15, 1963 H. D. NACHBAR ETAL 3,073,961
SHIPPING CONTAINER FOR RADIOACTIVE MATERIAL
Filed June 8, 1960 3 Sheets-Sheet 3

INVENTORS
HENRY D. NACHBAR
BILLY B. BIGGS
PAUL J. TARIELLO
KURT O. GEORGE
BY

3,073,961
SHIPPING CONTAINER FOR RADIOACTIVE MATERIAL

Henry D. Nachbar, Burnt Hills, and Billy B. Biggs, Paul J. Tariello, and Kurt O. George, Schenectady, N.Y., assignors to the United States of America as represented by the United States Atomic Energy Commission
Filed June 8, 1960, Ser. No. 34,850
5 Claims. (Cl. 250—108)

The present invention relates to shipping containers and in particular, to containers suitable for transporting radioactive material.

As the art of nuclear power develops, a need exists for refueling reactors and transportation of spent fuel elements from the reactor to a fuel reprocessing establishment. This operation presents a considerable problem since the spent fuel elements give off a large amount of heat, which must be dissipated, and also emit large amounts of radiation, which must be shielded against. Inasmuch as the spent fuel elements must often be transported for considerable distances by rail, tender or truck, a possibility exists that accidents of varying degrees of seriousness will occur en route. The container must, therefore, be built strongly enough so that in the event of any forseeable contingency the public health and safety will not be endangered by the escape of radioactivity.

It is the object of this invention to provide a shipping container that will meet all of the foregoing requirements.

It is a further object to provide a shielding container having a plurality of module holders for receiving spent fuel modules, means for removing heat from the spent fuel, and means for loading and unloading the container through the top thereof, said means comprising a rotatable top member having an opening therein that can be alined with any one of the module holders in the container as desired.

The foregoing objects are achieved by providing a primary pressure vessel and shield and a rotatable head therefor containing an access port eccentrically arranged so that it may be indexed with module holders in the container by rotation of the head. In order to accommodate the heat generated in the vessel, an internal heat exchanger is positioned within the vessel where it can absorb heat from a primary coolant therein. The liquid in the internal heat exchanger is then passed through a second, external heat exchanger where it transfers heat to the atmosphere. Additionally, fins are formed on the outer walls of the shield to dissipate heat from the shield. The vessel and the foregoing associated elements are provided with suitable mounting means whereby the entire assembly may be mounted on a railroad flat car of standard dimensions.

The invention may be more fully understood by reference to the drawings, wherein:

FIG. 2 is a partial plan view of the shipping container per se;

FIG. 3 is a vertical cross section of the shipping container taken along line III—III of FIG. 2;

Figure 1:
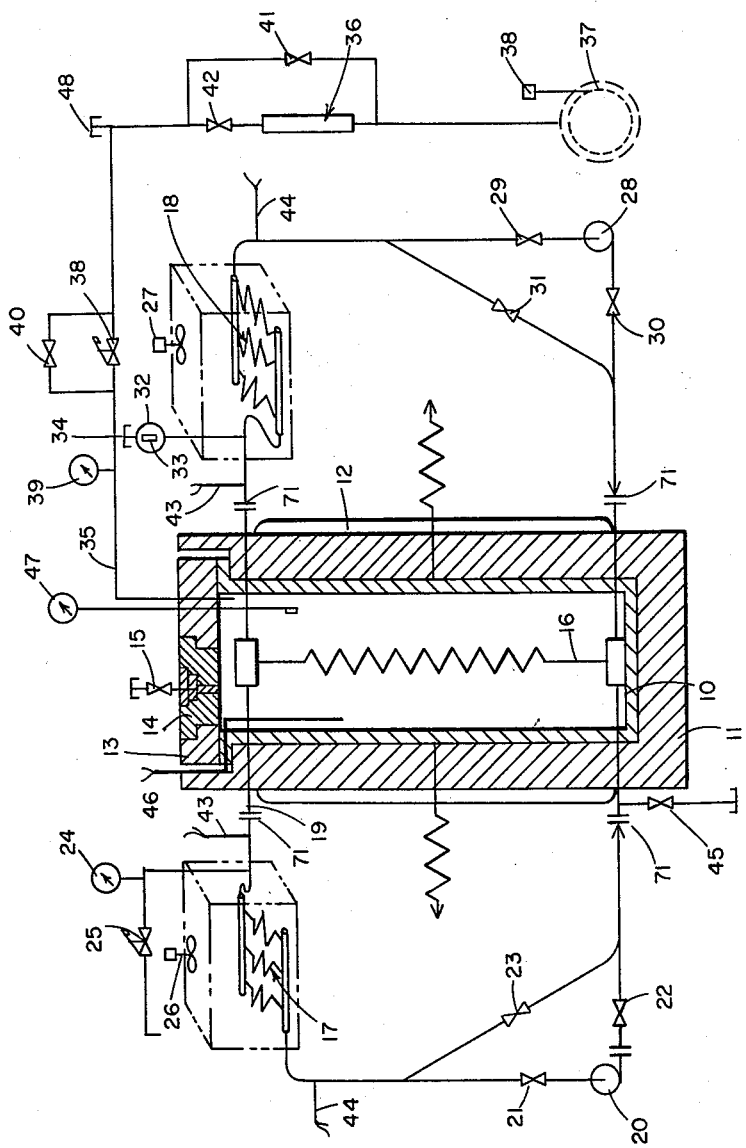
FIG. 1 is a schematic diagram of the shipping container and its associated cooling system.

The general organization of the subject shipping container may be readily understood by reference to the schematic diagram, FIG. 1. The apparatus is seen to consist of a primary pressure vessel 10 surrounded by a shielding container 11 provided with cooling fins 12. The container is closed by a head 13 having an access plug 14 mounted eccentrically therein. The plug is penetrated by a pipe for regulating the level of primary coolant within the container 10, the pipe terminating in a capped valve 15. Within the container 10 is an internal heat exchanger 16 in heat exchange relationship with the primary coolant. The heat exchanger 16 is connected to a pair of external heat exchangers of the air flow type 17, 18. It will be seen that heated liquid may pass through conduit 19, through heat exchanger 17 and back to the internal heat exchanger. When operating with forced circulation, this returning fluid will pass through a pump 20 and valves 21 and 22 at the inlet and outlet respectively thereof. When the pump 20 is not in use, these valves are closed and the fluid by-passes the pump through valve 23 which is then open. The heat exchanger 17 is provided with a conventional pressure gauge 24, relief valve 25 and a fan 26 for forcing air past the heat exchanger tubes.

The other external heat exchanger 18 is comparable, being provided a fan 27 and being connected with a pump 28, valves 29, 30 on the inlet and outlet sides of the pump respectively, and a by-pass valve 31 all of which are operated in a similar manner to the corresponding elements associated with the heat exchanger 17.

An expansion tank 32 and secondary coolant level gauge 33 are connected to the secondary coolant line and a filler pipe 34 is provided for adding fluid to the secondary coolant system as required.

Should the temperature within the container rise to the point where boiling of the primary coolant occurs, the resulting steam will escape through a line 35 to a steam-to-air condenser 36, where it will be condensed. Thereafter it will flow by gravity to a hold tank 37 provided with a conventional gas trap 38. A pressure relief valve 38 and a pressure gauge 39 for the primary coolant are included in the steam escape line 35 in the places shown. By-pass valves 40 and 41 are placed to permit fluid in the line 35 to by-pass the relief valve 38 and the steam-to-air condenser 36 respectively. When these by-pass valves are open, valves 38 and 42 will be closed.

Conventional temperature indicators are placed at 43 and 44 respectively to show the temperature of the secondary coolant at the inlet and outlet of the secondary heat exchangers. A drain valve 45 is provided to draw the secondary coolant.

The temperature and pressure of the primary coolant are given by conventional indicators 46, 47 respectively. Coolant is added to the primary system through a fitting 48 in the steam escape line.

The container is shown in detail in FIG. 3 and consists of a double-walled cylindrical vessel 10 of carbon steel clad with stainless steel. The volume between the inner and outer walls is occupied with a layer of lead 11 preferably at least 11.25 inches thick radially and 9.5 inches thick on the bottom so as to maintain the surface radioactive dose rate at not more than 200 mr./hr. during loading and 10 mr./hr. at a distance of five feet during shipment. Cooling fins 12 aid in the dissipation of heat generated within the container.

Axially of the container is the internal heat exchanger 16, which consists of a plurality of vertically arranged finned tubes 49 communicating with an inlet header 50 and an outlet header 51. An inlet 52 for the secondary coolant such as water or water and alcohol penetrates the wall of the container and communicates with the inlet header 50; and an outlet 53 removes coolant from the outlet header 51. The fluid in the tubes 49 removes heat from a primary coolant, for example, high purity water, which fills the container to a point near the upper wall of the outlet manifold 51.

Figure 5:
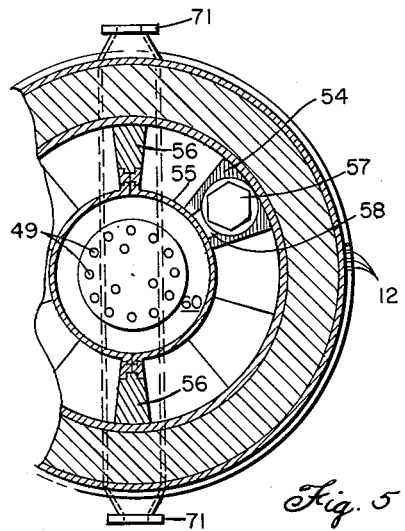
FIG. 5 is a partial cross section through the container taken along line V—V of FIG. 3 and showing an arrangement for supporting module holders for one type of nuclear reactor core.
Figure 4:
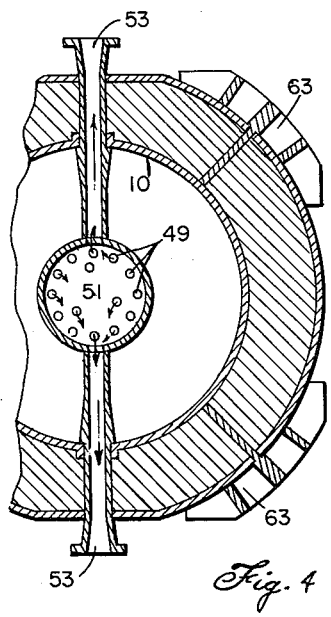
FIG. 4 is a partial cross section through the container taken along line IV—IV of FIG. 3.

A plurality of module holders 54 for the spent nuclear reactor fuel elements, are arranged around the inner wall of the container and in close contact therewith. As may be seen from FIG. 5, the module holders are retained in position by a cylindrical inner support 55 which is spaced from the inner wall of the container by a pair of wedge shaped spacers 56. Both the module holders 54 and the inner support member 55 are pierced with openings which permit the primary coolant to flow in contact with the spent fuel elements 57. As may be seen from FIGS. 3 and 5, a clearance exists between the fuel module and the fuel module holder. Primary coolant thus flows in the direction indicated by the arrows in FIG. 3, first around the lower end of the inner support 55, thence upwardly between the fuel element and the module holder and thence through aligned openings 58 in the module holder and 59 in the inner support and back to the annular zone 60 defined by the inner support 55 and the internal heat exchanger assembly.

The container may be lifted by means of four lifting lugs 61 and shackles 62 mounted on four flanges 63 spaced evenly about the upper periphery of the container (FIGS. 2, 3).

The container closure consists of a rotatable head 13 having an eccentrically positioned access plug 14 therein which may be indexed with any one of the fuel module holders as desired for inserting or removing spent fuel elements. The head is sealed to the container by means of an aluminium jacketed asbestos gasket 64 (FIG. 3) and is secured by hold-down bolts 65, the heads of which are countersunk below the top surface of the head.

The access plug is similarly sealed with gasket 66 and held by bolts 67 which secure it to the head (FIG. 2).

In order that the head may be removed from the container, countersunk head lifting bolts 68 are provided about the outer periphery of the head. To facilitate rotation of the head, a ball bearing is preferably included at 69. Alternatively, the entire head may be lifted clear of the container; rotated until the access plug is alined with a module holder as desired; and then lowered. It is to be noted that the head and access plug form a portion of the shielding system and thus must contain a sufficient mass of lead, e.g. 9 inches, or its equivalent to preclude the escape of radioactivity beyond tolerable limits.

Figure 6:
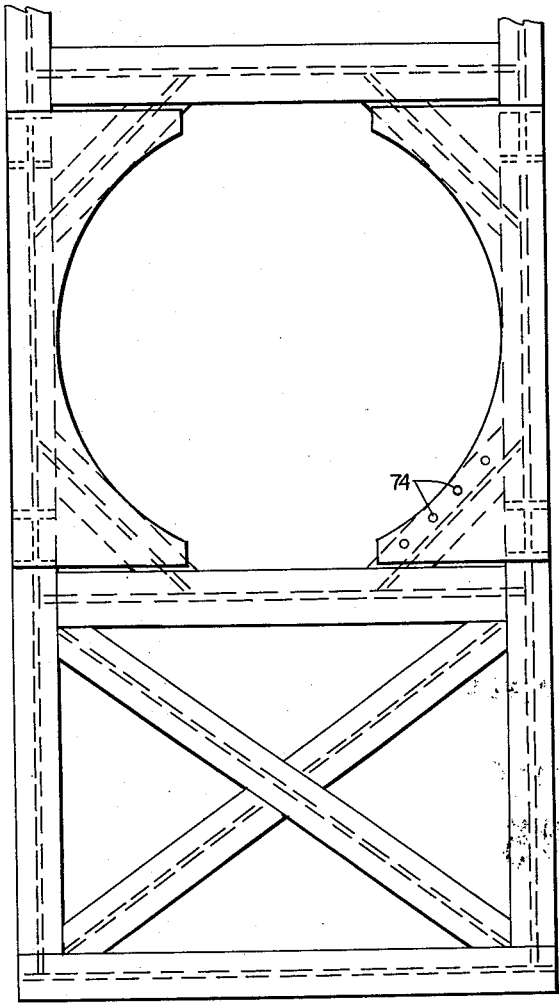
FIG. 6 is a plan view of the supporting frame for the container of FIGS. 2 to 5 inclusive.

The container is bolted to a frame, FIG. 6, by bolts which pass through bolt holes 70 in the flanges 63 and corresponding bolt holes 74 in the frame. The frame 6 also extends on opposite sides of the container and furnishes support for the external heat exchangers, pumps, valves and related equipment as shown in FIG. 1.

It is to be understood that the pressure vessel, head and access port are penetrated as required to permit the insertion of the primary coolant temperature and pressure indicators, the primary coolant level regulating pipe with its valve 15, and the steam escape line 35, all as shown in FIG. 1.

In use the vessel 10 is unbolted from its frame (FIG. 6) and disconnected from the external heat exchanger system by opening the four disconnection points 71 (FIG. 1). The vessel is then loaded. Normally the vessel is loaded as it rests upon a rail car or while aboard a submarine tender and is unloaded under water in a water pit at the fuel reprocessing center. If desired, loading can likewise be performed under water. In this operation a shield tank (not shown) may be placed on and supported by the head of the vessel 10. In order that this may be done, the valve 15 should first be removed so that the head will present a flat surface to receive the shield tank.

Fuel elements are next lowered through the access port into the fuel module holders until a shoulder 72 on the fuel element comes in contact with a corresponding shoulder 73 on the fuel module holder (FIG. 3).

When the vessel is loaded, the access port and head are bolted securely in place and the vessel is replaced in its frame and connected with its secondary heat exchanger system. The latter, when operated with forced water and air circulation is capable of removing 275,000 B.t.u./hr. of heat from the container. As shown, the two external heat exchangers are mutually independent, so that if one heat exchanger becomes incapacitated, the other heat exchanger will remain operable.

In the event that forced circulation is unavailable, the natural convection circulation in the secondary heat exchanger system is still capable of removing 75,000 B.t.u./hr. Should there be a casualty resulting in a total loss of secondary coolant, the primary coolant will boil off. As this fluid is radioactive, the steam is not permitted to vent to the atmosphere but instead, it is condensed and stored in the hold tank 37, which is itself provided with a gas trap to retain radioactive gas.

Should the primary coolant boil off completely, the heat generated by the spent fuel elements will cause the fuel module holders to expand into close contact with the inner wall of the vessel and the inner support 55 for the holders. This will sufficiently improve the thermal conduction through the vessel walls so that the combined conduction, convection and radiation from the vessel will dissipate 75,000 B.t.u./hr. without a break in the integrity of the container.

From the foregoing it will be seen that this invention provides a container having physical strength, heat removal capacity and radioactive shielding sufficient to assure safe loading, unloading and transportation of substantial amounts of radioactive reactor fuel elements. The container is further characterized by flexibility in service since any of a large variety of fuel module holders can be fitted into the tank, thereby permitting the container to be used for transportation of different sizes and shapes of fuel elements.

What is claimed is:

1. A shipping container for spent nuclear reactor fuel elements comprising a cylindrical pressure vessel adapted to contain a primary liquid coolant, a plurality of module holders fixedly mounted in a cylindrical array within the pressure vessel and in communication with the primary coolant, shielding material for the pressure vessel, a removable and rotatable circular head for the vessel, a removable access port in the head and positioned eccentrically thereof, whereby the access port is alinable with the module holders for loading and unloading the same, separate lifting means for the vessel and head, a heat exchanger within and arranged axially of the cylindrical array and immersed in the primary coolant, an inlet and an outlet for the heat exchanger, and means for indicating the temperature and pressure of primary coolant in said vessel.

2. A shipping container for spent nuclear reactor fuel elements comprising a cylindrical pressure vessel adapted to contain a primary liquid coolant, a plurality of module holders fixedly mounted in a cylindrical array within the pressure vessel and in communication with the primary coolant, shielding material for the pressure vessel, a removable and rotatable circular head for the vessel, a removable access port in the head and positioned eccentrically thereof, whereby the access port is alinable with the module holders for loading and unloading the same, separate lifting means for the vessel and head, a heat exchanger within and arranged axially of the cylindrical array and immersed in the primary coolant, an inlet and an outlet for the heat exchanger, a steam escape line connected with the interior of the pressure vessel, a condenser connected to the steam line for condensing steam therein, and a liquid hold tank connected to the condenser for storage of condensed liquid.

3. A shipping container for spent nuclear reactor fuel elements comprising a cylindrical pressure vessel adapted to contain a primary liquid coolant, a plurality of module holders fixedly mounted in a cylindrical array within the pressure vessel and in communication with the primary coolant, shielding material for the pressure vessel, a removable and rotatable head for the vessel, a removable access port in the head and positioned eccentrically thereof, whereby the access port is alinable with the module holders for loading and unloading the same, separate lifting means for the vessel and head, an internal heat exchanger within and arranged axially of the cylindrical array and immersed in the primary coolant, an inlet and an outlet for the heat exchanger positioned externally of the pressure vessel, at least one additional heat exchanger mounted externally of the pressure vessel, and fluid lines connecting said additional heat exchanger to the inlet and outlet of the said internal heat exchanger.

4. A shipping container for spent nuclear reactor fuel elements comprising a cylindrical pressure vessel adapted to contain a primary liquid coolant, a plurality of module holders fixedly mounted in a cylindrical array within the pressure vessel and in communication with the primary coolant, shielding material for the pressure vessel, a removable and rotatable head for the vessel, a removable access port in the head and positioned eccentrically thereof, whereby the access port is alinable with the module holders for loading and unloading the same, separate lifting means for the vessel and head, an internal heat exchanger within and arranged axially of the cylindrical array and immersed in the primary coolant, an inlet and an outlet for the internal heat exchanger, at least one additional heat exchanger positioned externally of the pressure vessel, fluid lines connecting said additional heat exchanger to the inlet and outlet of the internal heat exchanger, and pump means in said fluid lines between the outlet of the additional heat exchanger and the inlet to the internal heat exchanger to provide forced circulation in said fluid lines.

5. A shipping container for spent nuclear reactor fuel elements comprising a cylindrical pressure vessel adapted to contain a primary liquid coolant, a plurality of module holders fixedly mounted in a cylindrical array within the pressure vessel and in communication with the primary coolant, shielding material for the pressure vessel, a removable and rotatable circular head for the vessel, a removable access port in the head and positioned eccentrically thereof, whereby the access port is alinable with the module holders for loading and unloading the same, separate lifting means for the vessel and head, an internal heat exchanger within and arranged axially of the cylindrical array and immersed in the primary coolant, an inlet and an outlet for the internal heat exchanger, at least one additional heat exchanger positioned externally of the pressure vessel, fluid lines connecting said additional heat exchanger to the inlet and outlet of the internal heat exchanger, pump means in the said fluid lines between the outlet of the additional heat exchanger and the inlet to the internal heat exchanger to provide forced circulation in said fluid lines, and a steam escape system for the pressure vessel consisting of a steam escape line connected with the interior of the vessel, a condenser connected to the steam line for condensing steam therein, and a liquid hold tank connected to the condenser for storage of condensed liquid.

References Cited in the file of this patent

UNITED STATES PATENTS

| 2,514,909 | Strickland | July 11, 1950 |
| 2,811,487 | Stanton | Oct. 29, 1957 |
| 2,866,905 | Yeomans | Dec. 30, 1958 |
| 2,907,881 | Roucayrol et al. | Oct. 6, 1959 |
| 2,968,734 | Yeomans | Jan. 17, 1961 |

OTHER REFERENCES

Price et al.: Radiation Shielding, published by Pergamon Press (New York), 1957, page 233.